United States Patent [19]
Chapnik

[11] Patent Number: 5,579,164
[45] Date of Patent: Nov. 26, 1996

[54] SPATIALLY MULTIPLEXED IMAGE DISPLAY SYSTEM

[75] Inventor: Philip Chapnik, Newton, Mass.

[73] Assignee: Pharos Technology Corporation, Lexington, Mass.

[21] Appl. No.: 152,285

[22] Filed: Nov. 12, 1993

[51] Int. Cl.$^6$ .................. G02B 27/10; G02B 27/22; G02B 7/02

[52] U.S. Cl. .................. 359/618; 359/458; 359/463; 359/811; 359/819

[58] Field of Search .................. 359/463, 618, 359/628, 471, 479, 457, 458, 819, 820, 811, 455, 621, 802, 619, 622, 623

[56] References Cited

U.S. PATENT DOCUMENTS

| | | | |
|---|---|---|---|
| 2,268,351 | 12/1941 | Tanaka | 359/479 |
| 2,736,235 | 2/1956 | Toulon | 359/455 |
| 3,503,315 | 3/1970 | de Montebello . | |
| 3,592,529 | 7/1971 | Juhlin | 359/628 |
| 3,853,395 | 12/1974 | Yevick | 353/27 |
| 3,978,500 | 8/1976 | Brachet | 354/123 |
| 4,111,695 | 9/1978 | Yevick | 359/619 |
| 4,140,370 | 2/1979 | Snaper | 350/128 |
| 4,145,131 | 3/1979 | Yevick | 354/115 |
| 4,293,190 | 10/1981 | Clover | 359/802 |
| 4,323,925 | 4/1982 | Abell | 358/213 |
| 4,411,489 | 10/1983 | McGrew | 350/3.76 |
| 4,548,480 | 10/1985 | Yamamoto | 350/432 |
| 4,769,750 | 9/1988 | Matsumoto | 359/628 |
| 4,859,027 | 8/1989 | Kishida | 359/455 |
| 5,035,486 | 7/1991 | Inokuchi | 359/619 |
| 5,083,199 | 1/1992 | Borner | 358/88 |
| 5,098,302 | 3/1992 | Sekiguchi | 434/426 |
| 5,100,330 | 3/1992 | Sekiguchi | 434/426 |
| 5,113,213 | 5/1992 | Sandor | 355/22 |
| 5,132,839 | 7/1992 | Travis | 359/462 |
| 5,161,054 | 11/1992 | Williams, Jr. | 359/462 |
| 5,202,793 | 4/1993 | Auge | 359/463 |
| 5,281,301 | 1/1984 | Basavanhally | 359/621 |
| 5,289,311 | 2/1994 | McClelland | 359/457 |

OTHER PUBLICATIONS

*Three–Dimensional Imaging Techniques*, Takanori Okoshi, Academic Press, pp. 107, 108, 110 and 138.

"Real–Time Transmission of 3–D Images Formed by Parallax Panoramagrams", H. Higuchi and J. Hamasaki, *Applied Optics*, 15 Dec. 1978, pp. 3895–3902.

Primary Examiner—Georgia Y. Epps
Assistant Examiner—Ricky Mack
Attorney, Agent, or Firm—Brian M. Dingman

[57] ABSTRACT

A spatially multiplexed display system including a first plurality of separate lens units each having one or more lenses that are held together to create a large array of lenses. There is a second plurality of sub-image units, each having one or more sub-images. The sub-images are placed proximate the lenses to create a spatially multiplexed image.

39 Claims, 15 Drawing Sheets

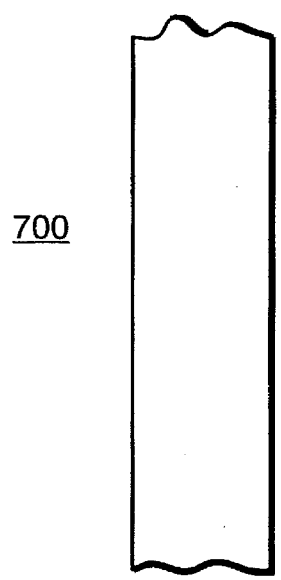
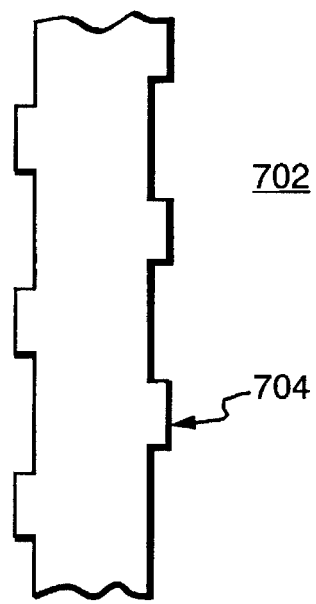
FIG. 7A                    FIG. 7B
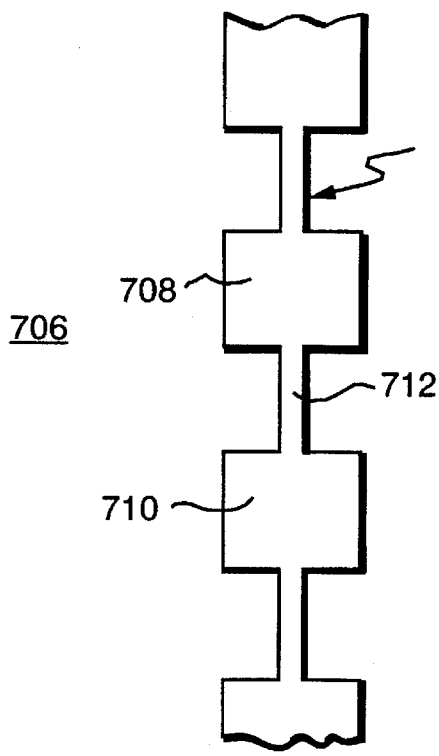
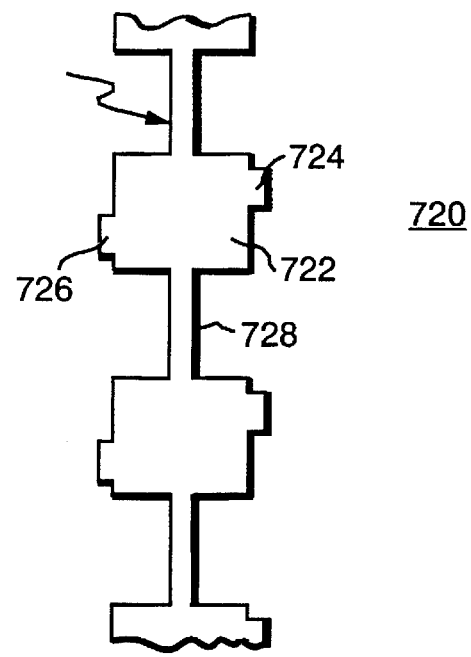
FIG. 7C                    FIG. 7D 5,579,164

SPATIALLY MULTIPLEXED IMAGE DISPLAY SYSTEM

FIELD OF THE INVENTION

This invention relates to a spatially multiplexed image display system that is particularly suited for making very large image displays.

BACKGROUND OF INVENTION

Three-dimensional image displays have been used for years. These displays typically employ spherical lenses (integral displays) or cylindrical lenses (lenticular displays). Both the integral and lenticular displays typically use a single plastic sheet incorporating an array of convex spherical or cylindrical lens surfaces that are molded, embossed, compressed, or cut into the surface of the plastic sheet. These designs typically employ narrow lenses with a small focal length to control aberrations and increase image quality. A portion of the image to be displayed, hereinafter referred to as a sub-image, is placed at or near the focal surface of each lens. The sub-image width is typically equal to or less than the center to center spacing or pitch of the individual lenses of the array. Accordingly, the narrow lens limits the amount of information or number of picture elements which can be present in each sub-image. The field angle over which the three-dimensional image is viewed is limited by the lens pitch and with most previous designs by the lens width. Increasing the width of the lenses so that the sub-image width can be concurrently enlarged increases the numerical aperture of the lenses, resulting in increased aberrations over the entire field of view, particularly at large field angles.

To obtain the best quality image throughout the viewing angle, the sub-images should be placed along the best image surface of each lens. However, the image surface of the lenses is typically a small-radius curve; it has proven difficult to produce a similarly curved sub-image. Accordingly, three-dimensional displays employ a flat image substrate that lies only partially in the image surface of each lens, resulting in a three-dimensional image which degrades for increasing field angles. U.S. Pat. No. 3,503,315 describes forming-spherical sub-image surfaces in photographic films which record and display a three-dimensional image as a complex means of solving this problem.

The apparent depth of a three-dimensional image is directly proportional to the number of resolvable picture elements in each sub-image. Because the focal length of the individual lenses is typically small, the number of resolvable picture elements, and therefore the apparent depth of the images, is limited. Since the displays are typically small and are perceived at close viewing distances, such limited apparent depth does not substantially degrade display performance. However, when viewed at an increased distance, the limited apparent depth degrades the overall three-dimensional effect of the display.

Another problem is that each sub-image must be aligned with a corresponding lens of the lens array to within approximately one picture element in order to create the desired overall three-dimensional image quality. The photographic film which typically carries the sub-images is somewhat dimensionally unstable, particularly in comparison to the material making up the lens array. In order to maintain alignment, it is necessary to either increase the size of the picture elements, thereby decreasing apparent depth of the image, or to limit the overall size of the display so that the proper alignment can be achieved and maintained over all lenses in the array. This is another factor limiting the size of three-dimensional displays. In attempts to compensate for this phenomenon, practitioners have placed the photographic emulsion directly upon the back of the lens arrays to allow the emulsion and lens arrays to shrink or expand together. This solution, however, requires specialized equipment and processing, which greatly increases the cost of the resulting product.

SUMMARY OF INVENTION

It is therefore an object of this invention to provide a spatially multiplexed image display system that can make extremely large displays.

It is a further object of this invention to provide such a system that can provide displays in which aberrations are limited over the entire field of view.

It is a further object of this invention to provide such a system in which the displays have increased field of view.

It is a further object of this invention to provide such a system in which the sub-images can be easily placed at the proper image surface and properly aligned with the lenses.

It is a further object of this invention to provide such a system in which the apparent depth of the display is large.

It is a further object of this invention to provide such a system in which the three dimensional effect can be seen from a great distance.

It is a further object of this invention to provide such a system in which the sub-image can be made by traditional photographic, conventional, or digital printing techniques.

This invention results from the realization that a quality spatially multiplexed image display system capable of displaying an image of arbitrary size can be accomplished by making a lens array from a number of regularly-spaced separate lens units, with a number of sub-image units which are individually aligned with the lens units.

This invention features a spatially multiplexed display system comprising a first plurality of separate lens units each having one or more lenses, and means for holding together the lens units to create a large array of lenses. "Lenses" as used herein includes traditional lenses which refract light rays, as well as parallax barrier array spacings between rulings, which also have the effect of allowing viewing of only a particular portion of the image at any given field angle. Further included is a second plurality of sub-image units, each having one or more sub-images, and means for placing the sub-images proximate the lenses to create a spatially multiplexed image.

In one embodiment, at least some or preferably all of the lens units include a plurality of lenses. The lenses may be all the same shape and size. The means for holding together the lens units may include connector means attached to or integral with the lens units. Further included may be aperture stop means for the lenses which may be accomplished with connector means including at least part of the aperture stops. In one embodiment, a connector means includes half of the aperture stop of two adjacent lenses. The connector means may include means for placing one said sub-image proximate a lens. In that case, the means for placing a sub-image proximate a lens would be accomplished with a sub-image capturing slot in the connector means.

The means for placing the sub-images proximate the lenses may include a sub-image holding backing member connectable to the connector means. In that case, the backing member may have a concave surface for holding the sub-image in a curved surface. The display may further include means for holding the connector means for fixing a plurality of lens units.

The lenses may include a spherical surface, or a cylindrical surface, or a general aspheric surface. The lenses may have multiple radii of curvature. The means for placing the sub-images proximate the lenses may include means for maintaining the sub-image proximate the image surfaces of the lenses. Alternatively, that may be accomplished by including means for maintaining the sub-images against the surfaces of the lenses. Each sub-image unit may include a number of sub-images. There may further be included aperture stops for each lens.

The lenses may be shorter than the display height and arranged to fill the display. In that case, the lenses may be arranged in a staggered lens array wherein each end of a lens is adjacent the ends of two other lenses. The means for placing the sub-images proximate the lenses may be accomplished with means for fixing each sub-image unit such that the sub-image picture element of each sub-image within the unit that is designed to be viewed at a given field angle intercepts the principal ray for that field angle. The lenses of the array are preferably regularly spaced. The sub-image units may include pixels offset in a non-orthogonal array. That may be accomplished by tilting the columns of an orthogonal array with respect to the lens orientation, or with respect to the viewer, and/or offsetting horizontal pixel positions in pixel rows.

In more specific embodiments, the image display system may include a plurality of lenses each having aperture stops for controlling image aberration, means for holding together the lenses in a regularly-spaced lens array, an equal plurality of sub-images, wherein a number of said sub-images may be interconnected to form sub-image units, and means for placing each sub-image proximate a corresponding lens to create a spatially multiplexed image. Alternatively, a spatially multiplexed image display may be accomplished with a plurality of separate lens units each including a number of regularly spaced lenses fixed together, and lens unit connector means for interjoining the lens units to make up a large array of lenses. In this embodiment, there is an equal plurality of sub-image units each having one sub-image for each lens of its corresponding lens unit. Further included are means for placing each sub-image proximate a lens such that the sub-image picture element of each sub-image within the unit that is designed to be on the corresponding lens optical axis intercepts the optical axis to create a spatially multiplexed unit.

DISCLOSURE OF PREFERRED EMBODIMENTS

Other objects, features and advantages will occur to those skilled in the art from the following description of preferred embodiments and the accompanying drawings in which:

FIGS. 7A through 7D are different embodiments of sub-image units for the various image displays, in which FIGS. 7A and 7B illustrate sub-image units for lenticular non-staggered arrays for use with a primary backing and with a slotted lens connector design, respectively, and FIGS. 7C through 7D are similar views for a staggered lenticular array;

This invention may be accomplished in a spatially multiplexed image display system including a plurality of separate lens units each having one or more lenses, and means for holding together the lens units to create a large array of lenses. Also included are a number of sub-image units each having one or more sub-images, and means for placing the sub-images proximate the lenses to create a spatially multiplexed image.

Figure 1A:
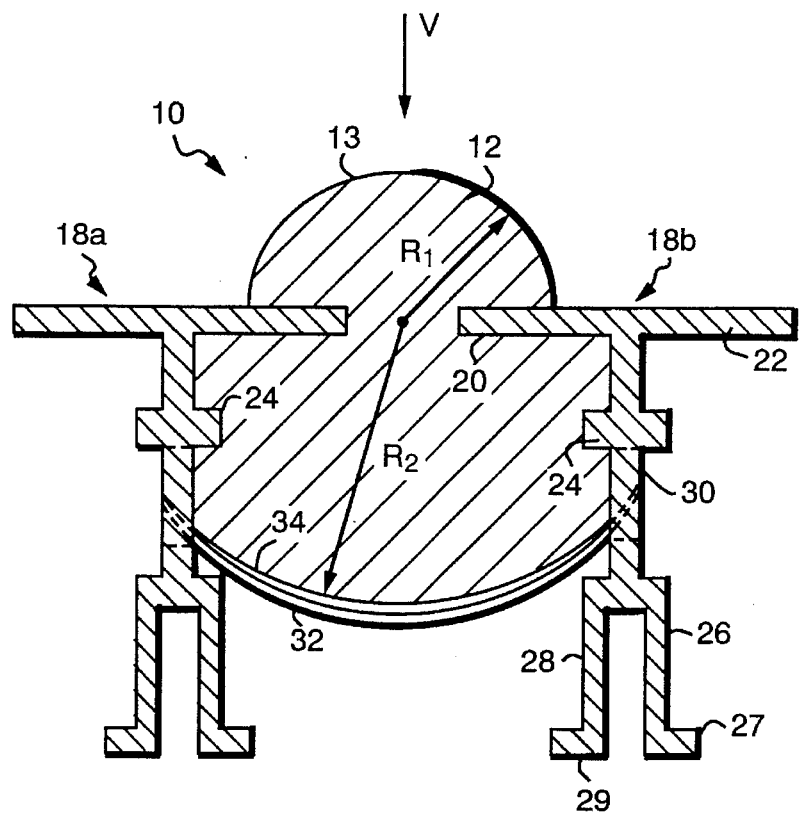
FIG. 1A is a cross sectional view of a single-lens lens unit and two connector elements of an embodiment of the spatially multiplexed display of this invention.

There is shown in FIG. 1A in cross sectional view a single-lens lens unit and two lens unit connector elements useful for the spatially multiplexed display of this invention. In this embodiment, lens unit 10 includes single cylindrical or spherical lens 12. For cylindrical designs, lens 12 may be as long as the height of the entire spatially multiplexed display, or shorter as further described below in conjunction with FIGS. 4A through 4C. Lens 12 has curved outer surface 13 that may be a cylindrical or spherical surface with radius of curvature $R_1$. Lower curved surface 34 may also be a cylindrical or spherical surface with radius of curvature $R_2$. Sub-image substrate 32, carrying the image to be displayed, is placed at the best focal surface of lens 12 by shaping it to fit in slots in lens connector elements 18a, 18b, as further described below.

Connector elements 18a and 18b serve a number of different purposes in this embodiment. First, the elements are used to interconnect the lens units to make a modular design that can include an arbitrary number of lens units 10 placed side by side to make up a display as wide as desired. Having separate lens units interconnected in this manner allows the display of this invention to employ relatively narrow sub-image substrates such as substrate 32 that have the proper alignment with the corresponding lens to provide a quality image.

Connectors 18a and 18b each include projecting reference tab 24 that fits in corresponding slots in lens 12 to hold lens 12 in place. Also included is upper horizontal member 20, 22, that also fits in corresponding slots in lens 12 to provide an aperture stop for the lens. The connectors also include slots 30 for accepting tabs along the edges of sub-image substrate 32 to maintain a desired alignment of the sub-image with the optical axis of the lens. Preferably, the alignment is such that the sub-image picture element of the sub-image that is designed to be on the optical axis of the lens intercepts the optical axis. In other words, that picture element is within one picture element width of the optical axis. By having a number of lens units, each with one or more lenses, in which the lens units are interconnected in the manner described, this invention allows the use of sub-images that can be maintained in such alignment with the optical axis to provide a high quality spatially multiplexed image that can have an arbitrary width and height without the image-alignment problems associated with other integral and lenticular displays.

Figure 1B:
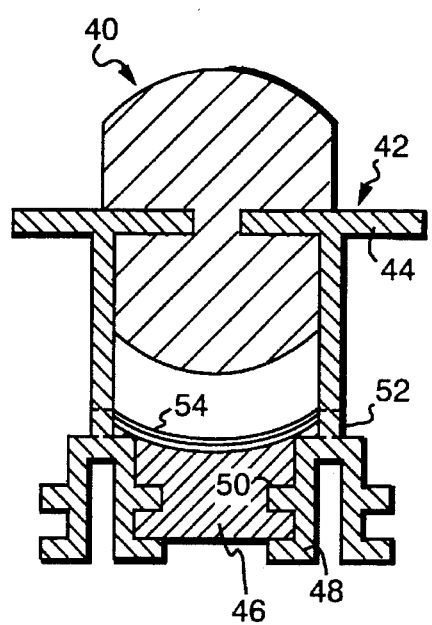
FIG. 1B is a view similar to that of FIG. 1A for another lens design and also illustrating another means of holding the sub-image substrate at the lens image surface.
Figure 1C:
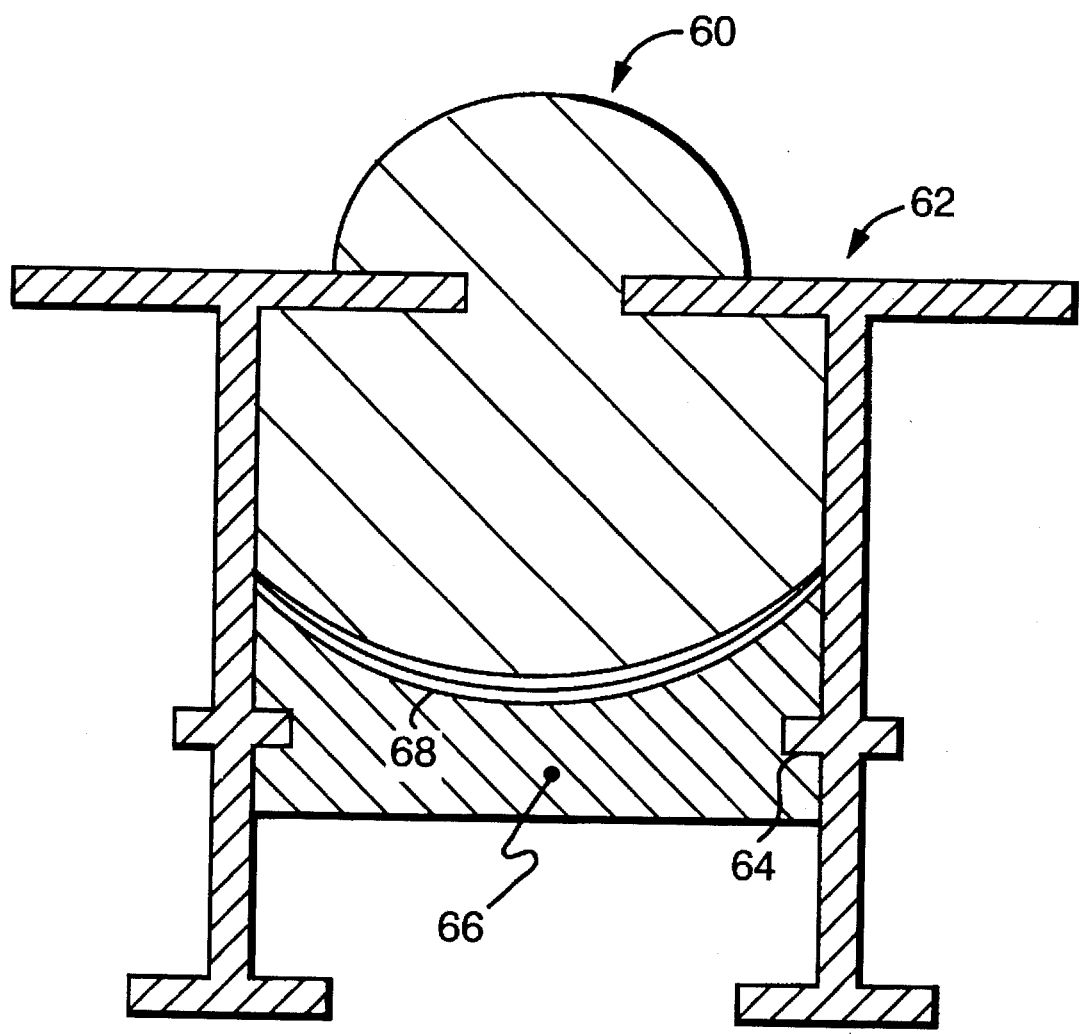
FIG. 1C is an alternative to FIGS. 1A and 1B.
Figure 1D:
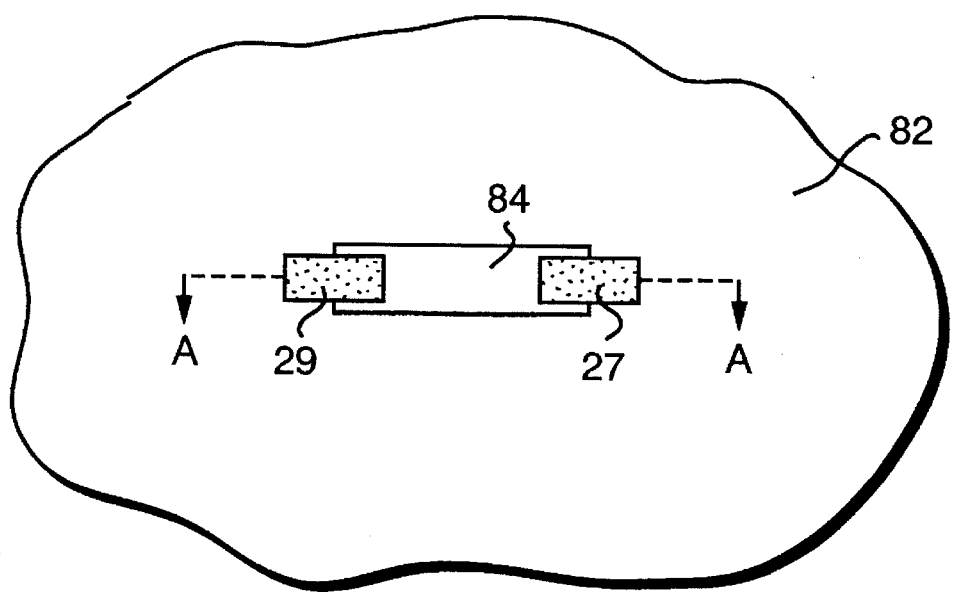
FIG. 1D is an enlarged bottom view of one means of holding together the lens units of the display of this invention, employing a backing which is used to hold all of the lens connectors.
Figure 1E:
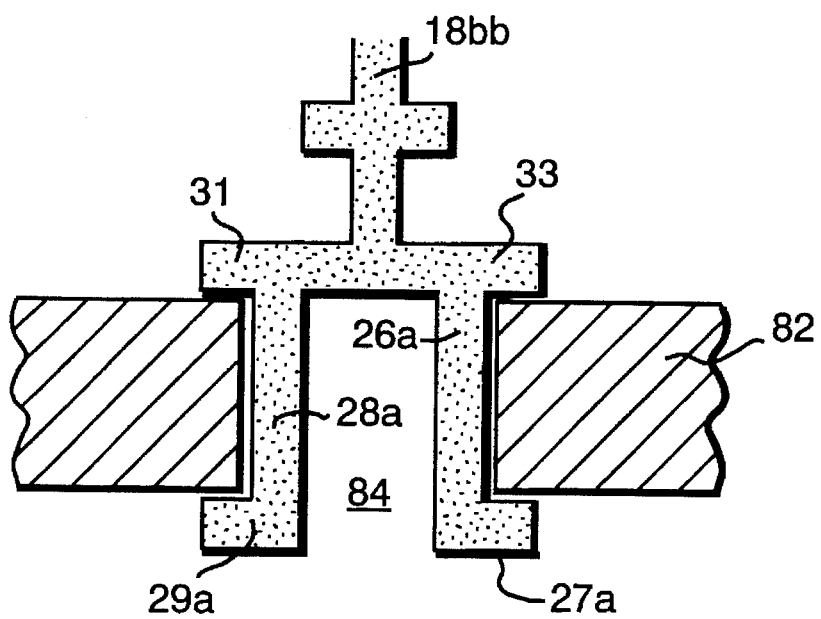
FIG. 1E is a cross sectional view taken along the line A—A of FIG. 1D.

Connector element 18b also includes lower legs 26, 28 having feet 27 and 29, respectively, that allow the connector elements to themselves be interconnected by a secondary backing, an embodiment of which is detailed in FIGS. 1D and 1E.

FIG. 1B discloses another embodiment of the lens design and sub-image substrate placing or holding means according to this invention. Lens 40 is maintained in place by aperture stop portion 44 of lens connector element 42 that fits in a corresponding slot in lens 40. In this embodiment, sub-image substrate 54 is spaced from lens 40 and is maintained in the desired curved focal surface by a combination of substrate tabs fitting in connector slots 52, along with a primary backing element 46 that is held in place between two of the connector elements 44 by including tabs 48 and 50, with tab 48 fitting underneath primary backing 46 and tab 50 fitting in a slot in member 46. Member 46 has a curved upper surface with a same curvature of that desired for substrate 54 so that member 46 helps to maintain substrate 54 in the desired curved focal surface.

FIG. 1C shows yet another alternative embodiment to the design of FIGS. 1A and 1B in which sub-image substrate 68 is held in place against the lower surface of lens 60 by primary backing member 66 having the desired curvature along its top surface and held in place by tab 64 in connector member 62. Substrate 68 accomplishes alignment by registration of the substrate edges against the connector means.

One manner of interconnecting the lens units to form the display of this invention is shown in FIGS. 1D and 1E. This method is accomplished by interconnecting the lens unit connector elements with secondary backing 82 having slot 84 for engaging with legs 26a and 28a of connector member 18bb. Lower feet 27a and 29a of legs 26a and 28a, respectively, are pressed together and pressed through slot 84. Feet 27a and 29a then spring back out to the locked position shown. Upper holding members 31 and 33 create a tight fit to lock member 18bb in place in backing member 82. This system thus holds all the connector elements in a predetermined relationship to allow the production of a spatially multiplexed display of arbitrary height and width including one or more lens units each including one or more lenses.

FIGS. 2A through 2D are illustrations of a number of different lens designs useful in this invention, also illustrating the optimum placement of the sub-image substrate for each of these lenses. The lenses are designed to have an acceptable amount of lateral aberration approximately less than or equal to the pixel size. This design criterion provides a display in which the sub-image substrate pixel size is the limiting factor for display resolution, rather than having the lens limit the resolution of the display as has been the case with other displays.

For these designs, the radii of curvature, R, are dependent upon the material choices and the aberration correction which is sought. Each design can be cylindrical or spherical.

Figure 2A:
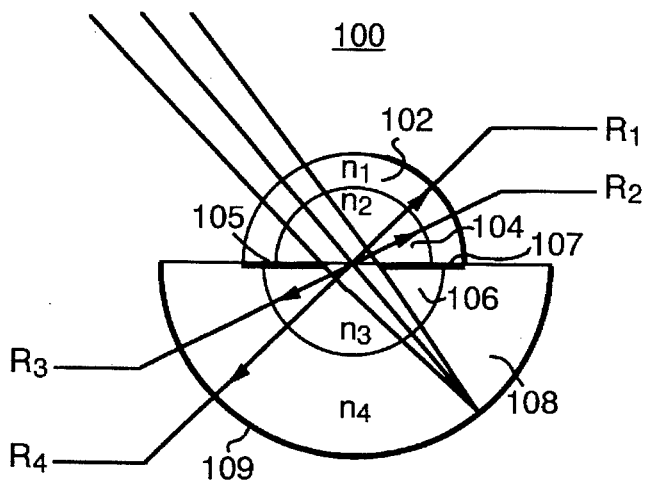
FIGS. 2A through 2D are illustrations of different lens designs useful in the invention, also illustrating the optimal placement of the sub-image substrate for each lens.

Lens 100, FIG. 2A, includes first lens 102 having refractive index $n_1$ and radius of curvature $R_1$, second lens 104 having refractive $n_2$ and radius of curvature $R_2$, third lens 106 having refractive index $n_3$ and radius of curvature $R_3$, and fourth lens 108 having refractive index $n_4$ and radius of curvature $R_4$. The image surface in this design is lower surface 109 of lens 108. Aperture stops 105 and 107 are included and may be accomplished by manners such as described above, or by other manners such as printing an opaque material onto the surfaces of the appropriate lenses. In a preferred embodiment of lens 100, the refractive indexes of all the lenses are identical so that the lens 100 can be made of one material, allowing the design to be molded or extruded if desired. Alternatively, the design can be made by two half-round rods that are glued or somehow connected together. This type of design is shown in FIG. 1A.

Figure 2B:
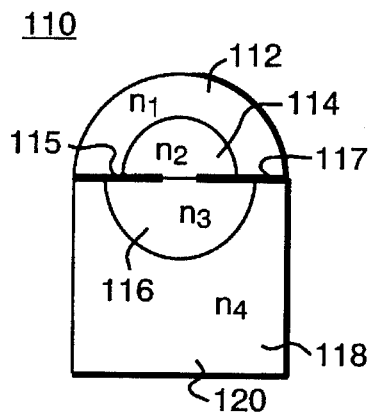

FIG. 2B illustrates alternative lens design 110 that includes lenses 112, 114, 116 and 118 along with apemare stops 115 and 117. This lens includes image surface 120 that is at the bottom of the lower lens 118. The preferred embodiment of this design is also to have each lens with the same refractive index ($n_1$–$n_4$) so that lens 110 can be made by extruding the entire shape, or in two pieces with an upper half-round piece and a lower rectangular piece that are interconnected.

Figure 2C:
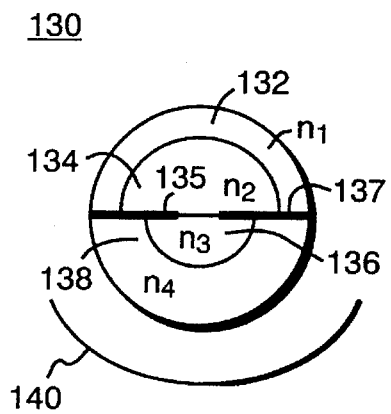
Figure 2D:
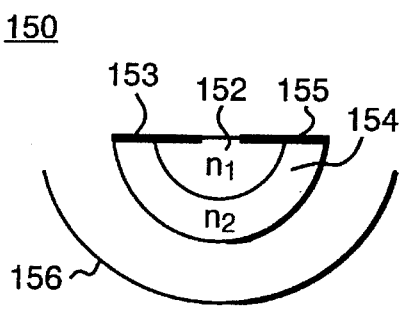

Lenses 130 and 150, FIGS. 2C and 2D, are basically different from lenses 100 and 110 in that they are designed to have an image surface spaced from the lower surface of the lens. Lens 130 includes lens elements 132, 134, 136 and 138 that are also all preferably made from the same material so that the lens can be an extruded rod having some means of providing apemare stops 135 and 137, for example by extruding slots into the rod that accept corresponding tabs from the lens connector elements as shown in FIGS. 1A through 1C. Image surface 140 is spaced from the lens. Lens 150, FIG. 2D, includes two lens elements 152 and 154 and aperture stops 153 and 155. In this design, the image surface is designed as surface 156 spaced from the lower surface of lens 154. As with the other lens designs, this lens is also preferably made of single material so that the lens can be made from a half round rod that may be extruded.

Figure 3A:
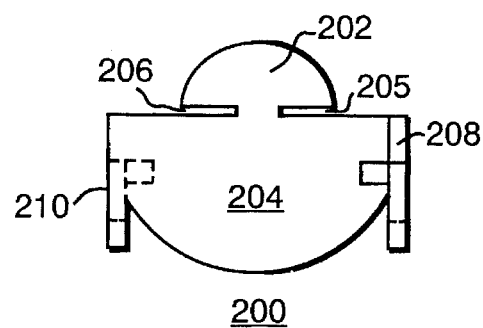
FIGS. 3A through 3C are a front view, left view, and right view, respectively, of another lens design according to this invention including integral slots for accepting both the connector reference tabs and the sub-image substrate.
Figure 3B:
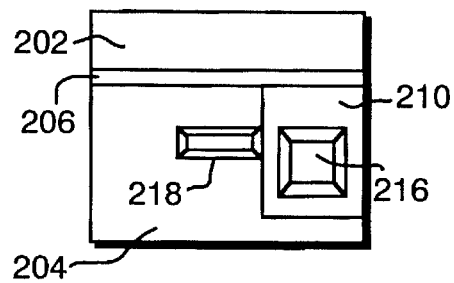
Figure 3C:
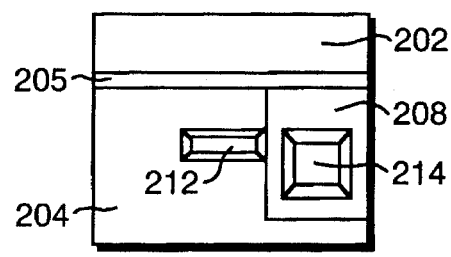
Figure 3D:
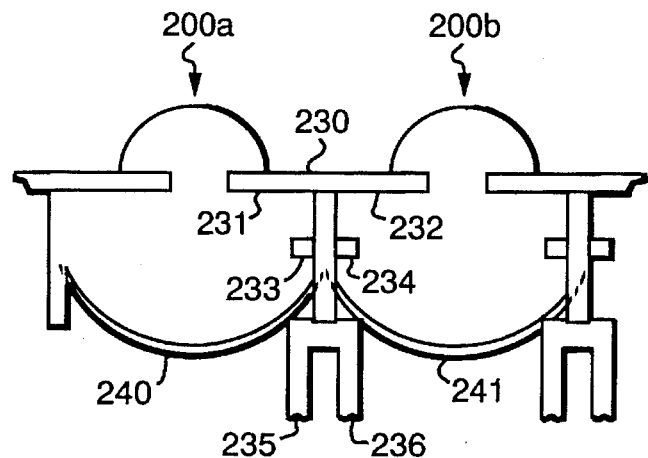
FIG. 3D is a cross sectional view of two of the lenses illustrated in FIGS. 3A through 3C, detailing the connectors and the sub-image substrate.

FIGS. 3A through 3C are a front view, left view, and right view, respectively of another lens design according to this invention including integral slots for accepting both connector reference tabs and the sub-image substrate reference tabs. Lens 200 follows the design criteria of lens 100, FIG. 2A, including upper half round or half spherical lens member 202 and lower half round or half spherical lens member 204 with slots 205 and 206 therebetween for accepting tabs 231 and 232 of lens connector 230, FIG. 3D, to form the aperture stop for the design. Lens 200 includes projecting generally rectangular elements 208 and 210 that include slots or holes 214 and 216 therethrough, respectively, to accept projecting tabs, not shown, in the sub-image substrate such as substrates 240 and 241, FIG. 3D, to maintain the proper horizontal alignment of the sub-image substrate with the lens. Slots 212 and 218 are formed in lens element 204 for accepting connector reference tabs such as reference tabs 233 and 234 of connector 230, FIG. 3B, to maintain lens 200 in place.

Figure 4A:
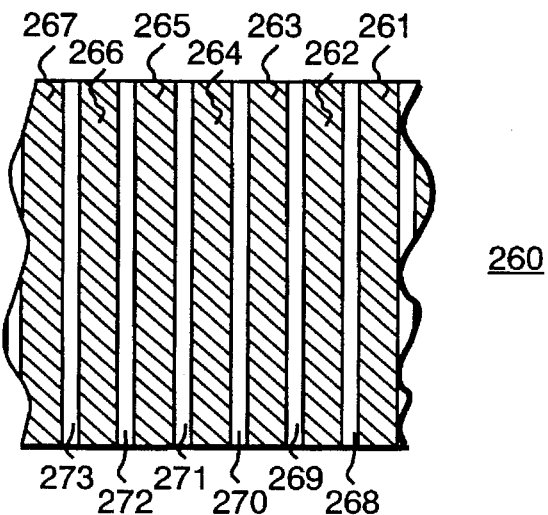
FIG. 4A is a top view of one embodiment of a lenticular array according to this invention detailing the appearance of the aperture stops and the entrance pupils.
Figure 4B:
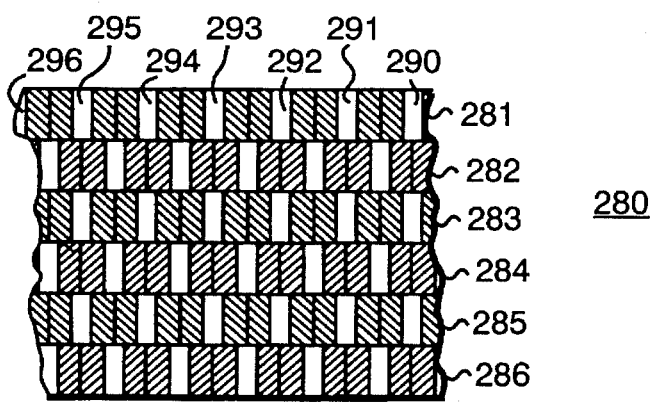
FIG. 4B is a similar view for a lenticular array having smaller cylindrical lenses offset from row to row to create a staggered array so that the aperture stops do not appear as vertical lines.
Figure 4C:
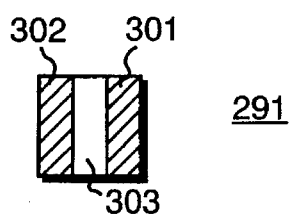
FIG. 4C is an enlarged view of one lens of the array of FIG. 4B.

The front view of two alternative lenticular lens display designs is shown in FIGS. 4A and 4B. Design 260, FIG. 4A, includes cylindrical lenses that have a length equal to the height of the display. The lenses are held side by side as described to form a display having a desired width. Since there is only one, or a relatively small number, of lenses in each separate lens unit, the sub-image substrate for each such lens unit has a width much smaller than the width of the display so that proper horizontal alignment between each sub-image substrate and its corresponding lens may be maintained to maintain the image quality.

In the front view of FIG. 4A, on close inspection the viewer would see aperture stops 261 through 267 and entrance pupils 268 through 273. The aperture stops decrease aberration but also decrease the amount of light transmitted from the image. Therefore, there must be some balance between the relative widths of the aperture stops and the entrance pupils. It has been found that the aperture stops typically in total can be no more than three times the width of the entrance pupils to maintain sufficient light to provide a quality image. Additionally, for larger fields of view, larger aperture stops are required. Accordingly, these design criteria must be balanced to create an image having a desired quality depending at least partially on the lighting conditions, the field of view, and the expected proximity of the viewer to the display.

An alternative to cylindrical lenses having a length equal to the height of the display as shown in FIG. 4A, is shown in FIG. 4B. Display 280 includes a number of shorter cylindrical lenses arranged side by side in rows 281 through 286 making up the entire height of display 280. For example, row 281 includes lenses 290 through 296; lens 291 is shown in some detail in FIG. 4C as including aperture stops 301 and 302 and entrance pupil 303. This staggered array gives better apparent resolution and therefore could lead to a larger field of view for the display.

Figure 5A:
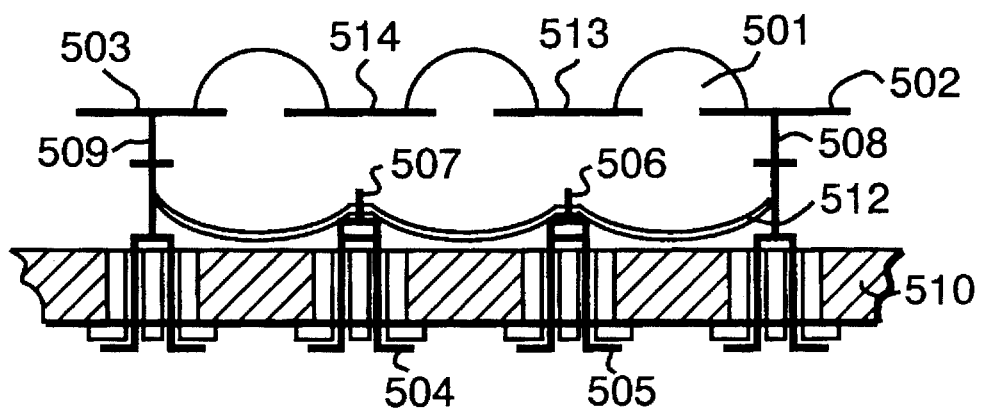
FIG. 5A is a cross sectional view of an alternative preferred embodiment of this invention in which more than one lens is included in a lens unit, illustrating a lens unit, the lens connectors, the sub-image substrate holding elements, and the means for holding the lens units together.

FIG. 5A is a cross sectional view of a portion of an alternative embodiment of this invention in which more than one lens is included in the lens unit. This figure illustrates a single lens unit 501 having three lenses integrally formed to make up lens unit 501. Aperture stops 513 and 514 in this embodiment are not accomplished by connector elements 502 and 503, but must be accomplished in another manner such as by printing them on the lenses or inserting blocking members in slots formed in the lenses. Correspondingly, sub-image substrate 512 must include three separate sub-images, one for each of the three lenses of the lens unit. Substrate 512 may include holes or slots in the appropriate position for accepting projecting substrate-registration pins or tabs 506 and 507 of connector members 505 and 504, respectively, that would be designed to pass through substrate 512 and into lens unit 501 to hold substrate 512 in place, and in proper alignment. The outer connector elements 508 and 509 are more along the lines of the connector elements described above to accomplish the interconnection of lens unit 501 to similar lens units, not shown, alongside unit 501. These connectors are held in backing member 510 in a desired manner, for example in the manner shown in FIGS. 1D and 1E.

Figure 5B:
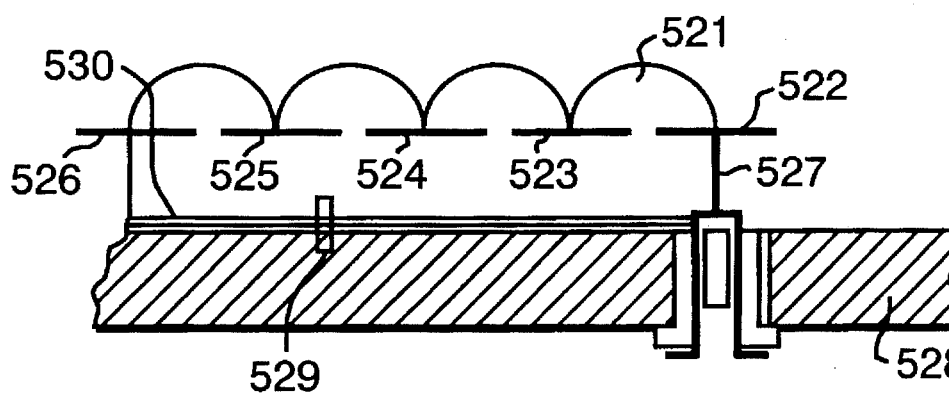
FIG. 5B is an alternative to the construction of FIG. 5A in which the sub-image substrate is held flat.

FIG. 5B is an alternative to the construction of FIG. 5A in which the sub-image substrate 530 is held flat between backing member 528 and lens unit 521 that in this example integrally includes four lenses with aperture stops 522 through 526. Lens unit 521 is held in place by connector element 527 which is itself held in place by backing member 528. Sub-image substrate 530 is held in proper lateral alignment with the lenses by registration pin 529 embedded in lens unit 521 and/or backing member 528, and a corresponding, carefully placed and sized hole through substrate 530.

Figure 5C:
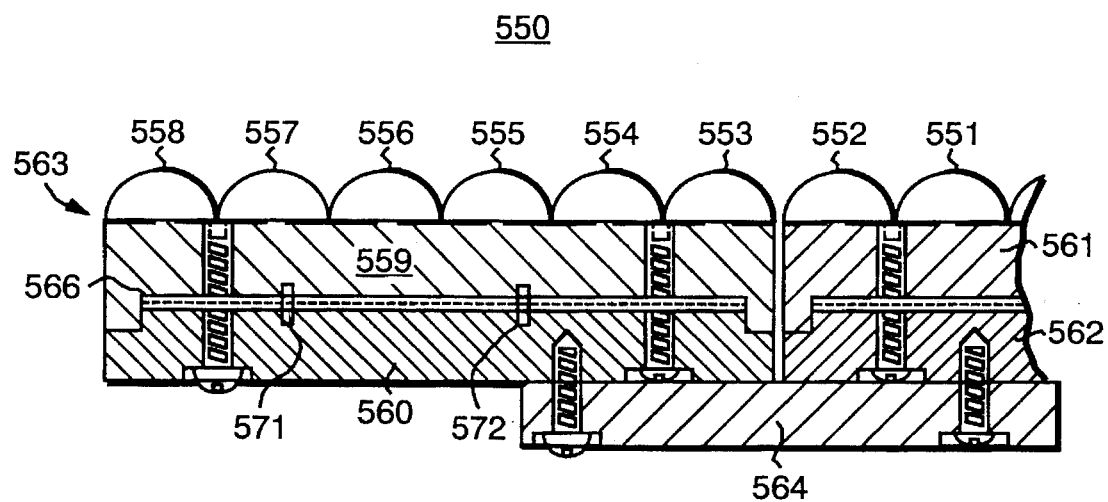
FIG. 5C is a cross sectional view of a portion of an entire spatially multiplexed display employing the construction of FIG. 5B.

Yet another embodiment of a multiple-lens lens unit design of the display of this invention is shown in FIG. 5C. Display 550 includes lens unit 563 having six lenses 553 through 558. This embodiment could be accomplished by using a flat sheet 559 with a number of half round elements 553 through 558 fixed thereon, and including aperture stops. Sub-image unit 566 would be held in place at the bottom of member 559 by backing member 560 that is connected to member 559, for example with screws as shown. Backing member 562 of adjacent lens unit 561 having lenses 551 and 552 would be held in place in relation to lens unit 559 by including another common backing member 564 that is attached to both members 560 and 562. Preferably, members 560 and 562, and potentially member 564, are transparent or at least translucent to allow back lighting. Attachment and proper alignment of the sub-image units could also be accomplished with registration pins 571, 572 placed in lens unit 563, and corresponding carefully placed holes in sub-image unit 566.

Figure 5D:
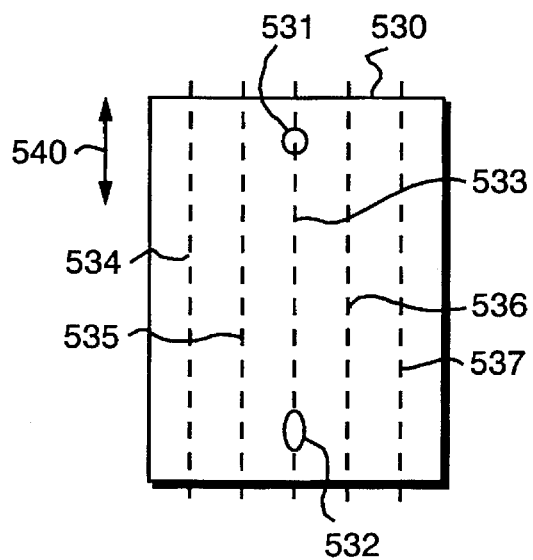
FIG. 5D is a schematic representation of a sub-image unit according to this invention.

This sub-image registration is shown in more detail in the top view of FIG. 5D which shows a schematic representation of sub-image unit 530. The pixels of unit 530 are arranged a number of vertical columns that are parallel with the lens or ruling orientation 540. A view of those columns are schematically depicted by lines 534 through 537, although the actual product would have many more columns of very small pixels. Hole 531 and slot 532 are stamped or cut through substrate 530 so that the substrate can be mounted on registration pins embedded in the corresponding lens unit for the sub-image. Slot 532 allows some vertical motion or motion in the direction of arrow 540 to make up for any misalignment and to allow for thermal growth between the sub-image unit and the corresponding lens unit. It is more important, however, to accomplish proper lateral alignment of sub-image 530 in relation to the corresponding lens unit so that each picture element of sub-image unit 530 that is designed to be viewed at a given field angle intercepts the principal ray for that field angle. This is accomplished by carefully placing the registration pins and holes 531 and 532, which are sized to exactly fit over the pins.

Figure 6A:
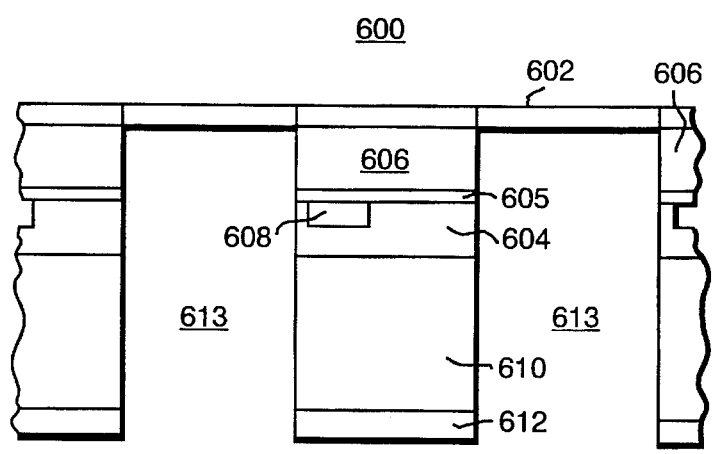
FIGS. 6A through 6C are a side view, top view and front view, respectively, of a combination lens connector and aperture stop that can be used to make up a staggered array such as shown in FIG. 4B.
Figure 6C:
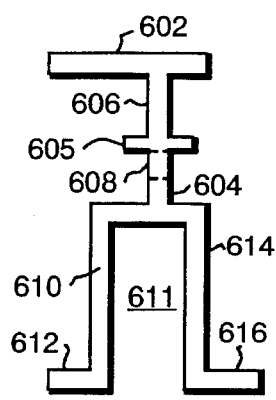
Figure 6B:
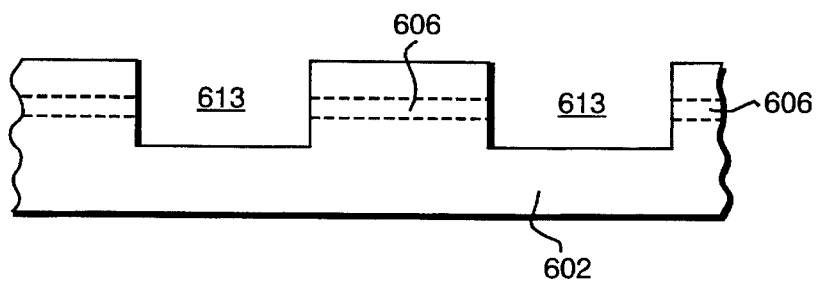
Figure 6D:
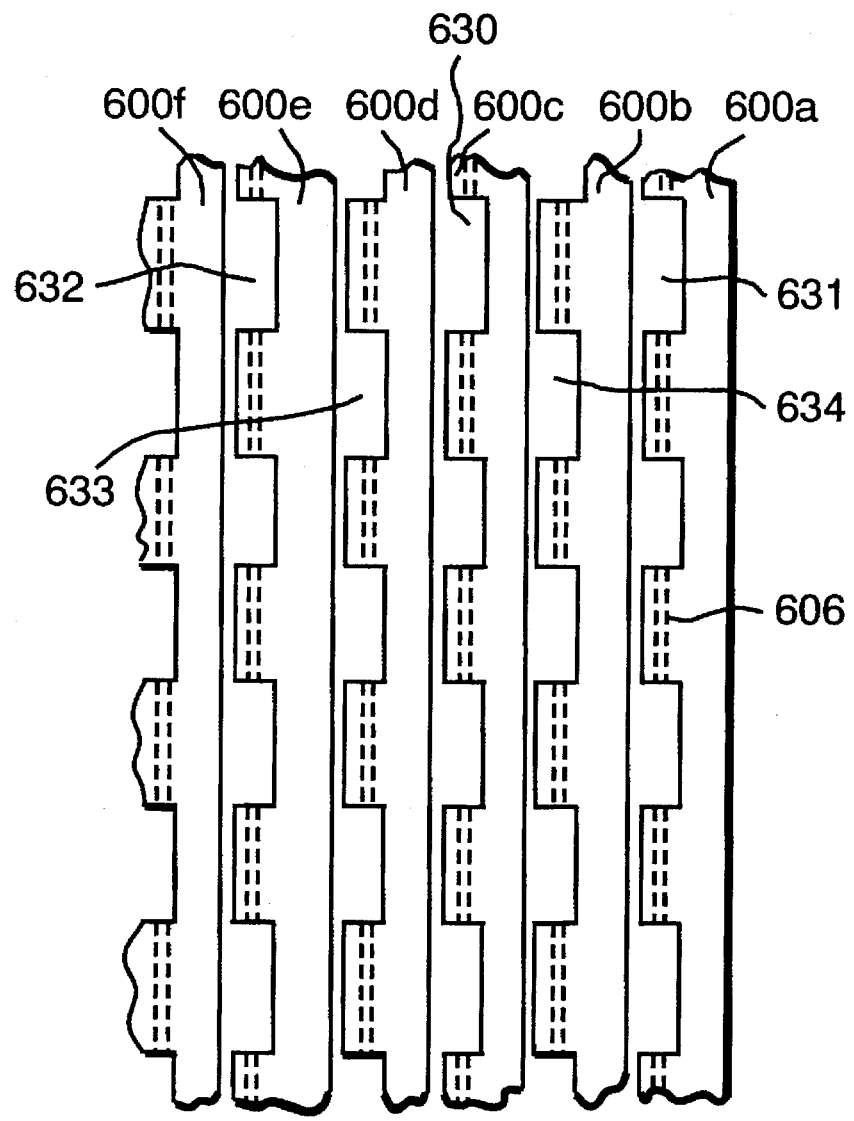
FIG. 6D is a top view of a portion of a display including the lens connectors of FIGS. 6A through 6C showing the aperture stops and the entrance pupils.

FIGS. 6A through 6C are a side view, top view, and front view, respectively, of a combination lens connector and aperture stop that can be used to make up a staggered array such as shown in FIG. 4B, and FIG. 6D is a top view of a portion of a display including the lens connectors of 6A through 6C showing the aperture stops and apertures in detail. Combination lens connector and aperture stop 600 includes upper horizontal portion 602, vertical leg 606, reference tab portion 605, and film or sub-image substrate reference slot 608 in lower vertical portion 604. Legs 610 and 614 define a spacer slot 611 for a sub-image connector. Open portions 613 between identical members 606, that are interconnected by member 602, accept the lenses. As best shown in FIG. 6D, the display employing this combination lens connector and aperture stop making up a staggered cylindrical lens array is accomplished with a number of adjacent, identical such combination lens connector/aperture stop members 600a through 600f shown slightly spaced apart for ease of illustration only. In actual use, these members would be touching. The members form slots such as slots 630 through 634 that accept lenses. Then, portions 602 of adjacent members 600 fit into slots cut into the lenses as shown in FIG. 1A to accomplish the aperture stops, so that the openings 630 through 634 form the apertures.

Four different sub-image substrate shapes are shown in FIGS. 7A through 7D. Sub-image substrates 700 and 702, FIGS. 7A and 7B, respectively, are for lenticular non-staggered arrays for use with a primary backing and with a slotted lens connector design, respectively. With a primary backing, sub-image substrate 700 does not need any edge connection means as does sub-image substrate 702, FIG. 7B, which includes edge projections 704 for fitting into slots in the lens connectors, or lenses, as appropriate and as described above. For making up staggered lens arrays, sub-image substrates 706 and 720, FIGS. 7C and 7D, respectively, accomplish spaced sub-images 708 and 710 interconnected by interconnecting portion 712 that may pass through opening 611, FIG. 6C. With no backing member, sub-image substrate 720, FIG. 7D, includes sub-image reference tabs 724 and 726 on each sub-image 722 for fitting in slots in the lenses, or in the lens connector elements as appropriate. This embodiment must also include substrate sub-image connecting portions 728 so that a staggered array can be accomplished.

As an alternative to the embodiments of FIGS. 7B and 7D, the sub-image substrate referencing tab or pin could be in the lens or lens connector elements, and the substrate could have corresponding slots or holes for accepting the tabs or pins to properly align the images carried by the substrate with the corresponding lenses. The slots or holes could be on the edges, or within, the substrates. If they are within the substrate, alignment could be accomplished by including registration marks in the substrate images, and then using the marks to locate an appropriately sized and shaped hole punch.

Figure 8:
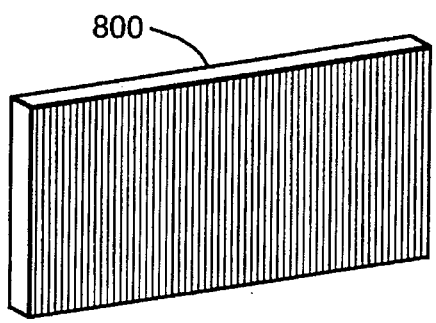
FIG. 8 is an axonometric view of a lenticular display according to this invention.
Figure 9A:
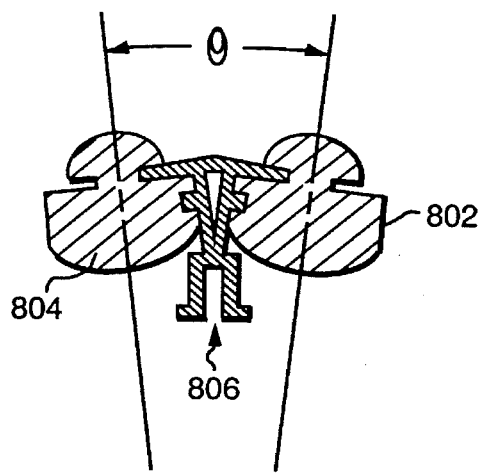
FIG. 9A is a cross sectional enlarged view of a lens design and lens connector design for accomplishing a cylindrical lens screen such as the convex cylindrical and concave cylindrical displays shown in FIGS. 9B and 9C, respectively.
Figure 9B:
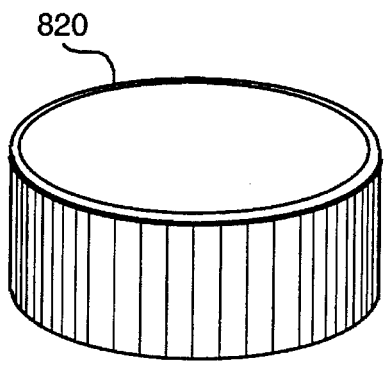
Figure 9C:
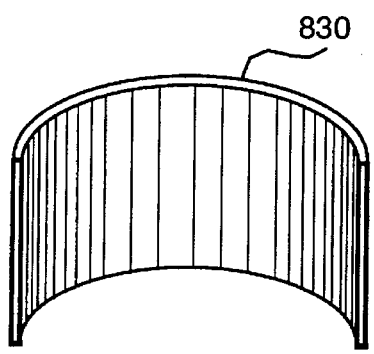

FIGS. 8, 9B and 9C are axonometric views of a flat, convex cylindrical, and concave cylindrical format for the displays of this invention. For accomplishing the convex or concave formats, the lenses 802 and 804 and lens connector 806, FIG. 9A, may be designed to hold lenses 802 and 804 at an angle θ to accomplish a gradual curve as desired.

Figure 10A:
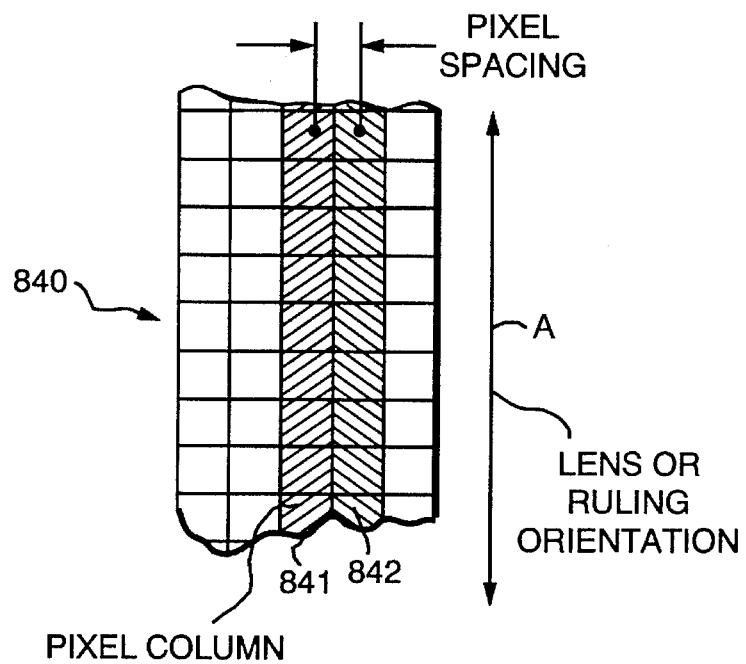
FIG. 10A is a schematic diagram of the orthogonal pixel arrangement in a typical sub-image composed of a number of discrete picture elements.

FIG. 10A schematically depicts sub-image 840 including a number of orthogonally-arranged pixels represented by rectangles in the drawing. Pixel columns 841 and 842 are shaded. Sub-image 840 has a center-to-center pixel spacing equal to the pixel width. The pixel columns are typically arranged parallel to either the lenses of a lenticular array or the rulings of a parallax barrier. Each column represents a portion of the multiplexed image from a discrete view angle. Because the column has a finite width, it is viewed over a finite angle through the lens or ruling. When the viewer moves horizontally with respect to the display, or vice versa, the viewer observes successive pixel columns in the sub-image. Due to the finite pixel width, the multiplexed image appears to change discretely, or "jump". For three-dimensional display schemes, this jumping effect is most noticeable for objects which appear in the deep background or in the nearest foreground.

Figure 10B:
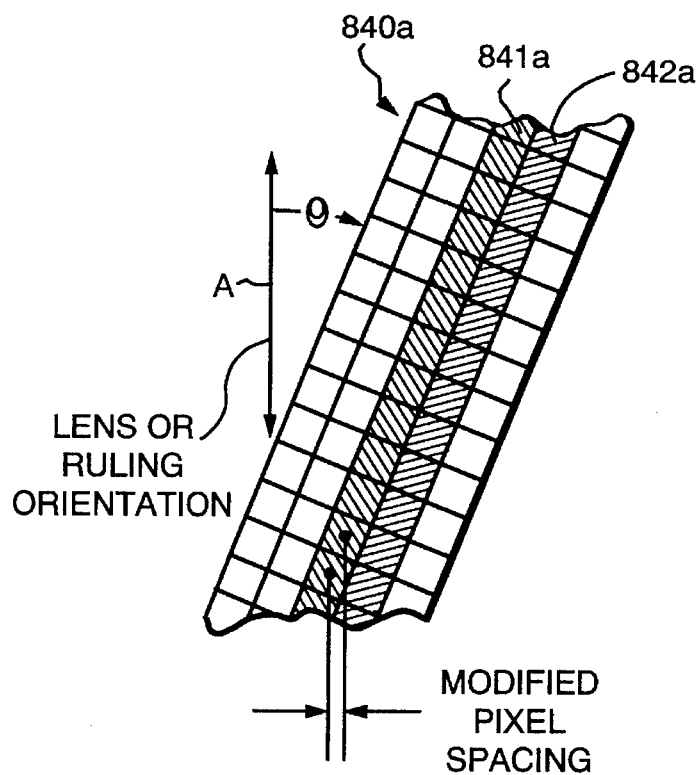
FIGS. 10B–10D are three alternate pixel arrangements according to this invention for decreasing the center-to-center pixel spacing to decrease the image "jumping" effect due to the finite pixel width.

The jumping effect can be diminished, or smoothed out, by setting the pixel columns at an angle θ, FIG. 10B, with respect to the lens or ruling orientation A. This provides a pixel array 840a with a smaller pixel-to-pixel spacing than the width of the pixels. This procedure, illustrated in FIGS. 10B–10D, causes pixels which neighbor one another to lie partially in each other's field of view. Thus, the image which is meant for a particular field angle is seen, though only partially, in the successive field angle. The effect is essentially one of spatial dithering and is analogous to diminishing the jagged effect of tilted lines in a two-dimensional picture in which the pixel density is limited.

Figure 10C:
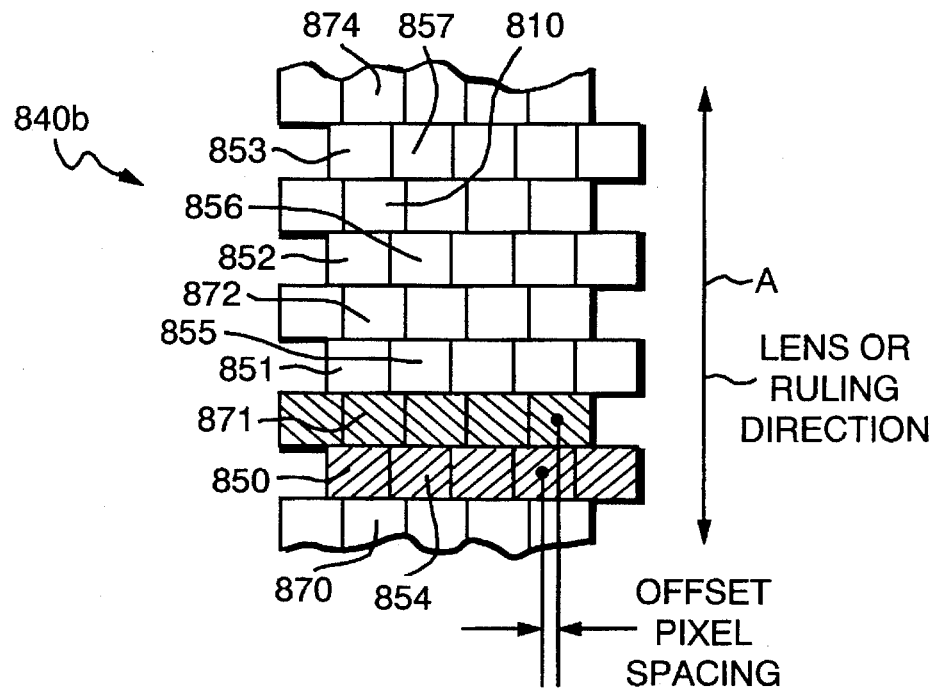
Figure 10D:
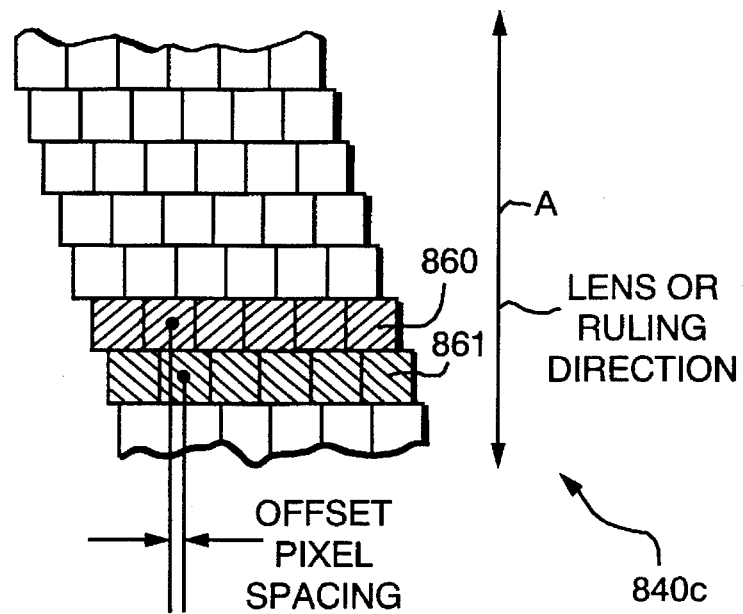

The embodiments of FIGS. 10C and 10D differ in that the pixel columns remain parallel to lens direction A. In these embodiments, the horizontal position of the pixel centers are offset in successive pixel rows such as rows 860 and 861, FIG. 10D. In these embodiments, the pixels may additionally be offset in the vertical direction such as shown in FIG. 10B. With these offset pixels, the pixels in each column are not contiguous. For example, sub-image 840b, FIG. 10C, includes a number of columns of pixels, one column including pixels 850–853 and the adjacent column including pixels 870–874 which are each in separate rows from the pixels of the previous column. The next column, composed of pixels 854–857, has pixels which reside in the same rows as the column two columns away composed of pixels 850–853.

Each of these sub-image arrangements may be accomplished with traditional photographic techniques. Alternatively, with lenticular or parallax barrier methods, a mask with alternating transparent and opaque lines of properly selected widths, with lines running in a direction non-perpendicular to the lenses or rulings, would be translated across the image plane (or intermediate image plane) as the object seen from successive field angles is exposed upon the photographic emulsion.

Figure 11:
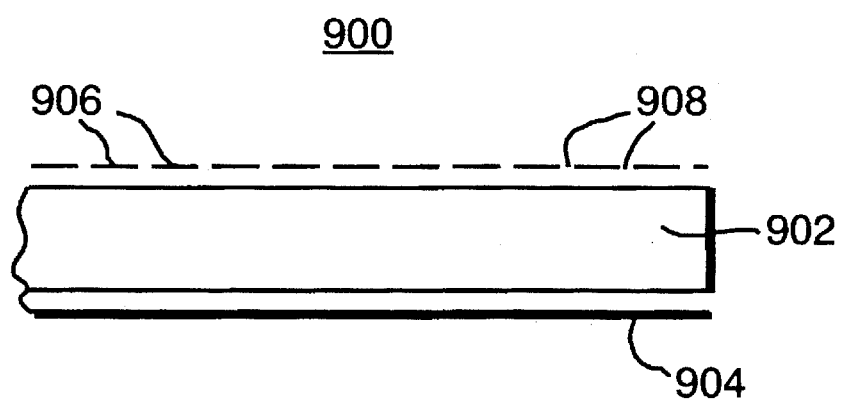
FIG. 11 is a cross-sectional schematic view of a parallax barrier image display system for accomplishing this invention.

It should be understood that this invention includes not only traditional lenses and lens units as shown in the above figures, but also includes, as substitutes for aperture stops and lenses, respectively, parallax barrier rulings and inter-ruling spacings. A typical parallax-barrier display 900 is shown in FIG. 11. Display system 900 includes image substrate 904 at the back of transparent spacer 902 that carries or supports opaque parallax rulings 906 which define therebetween spaces 908. Spaces 908 are equivalent to the lenses of the display system described above, and rulings 906 are equivalent to the aperture stops in the systems described above. The desired effect of this invention may be accomplished with system 900 in the same manner it is with the system depicted in the previous figures.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A spatially multiplexed image display device for displaying to a viewer a series of different fixed images as the viewer moves in relation to the display device, comprising:

at least two separate lens units, each having a plurality of lenses, each said lens unit having a width and a length and edges;

means for holding together said lens units edge-to-edge to create an array of lenses for viewing by a viewer;

a plurality of sub-image units, each having a plurality of sub-images, each said sub-image carrying multiple separate image portions, each said image portion being a small portion of an overall image designed to be viewed in said display device, wherein there is one said sub-image for each lens in said array of lenses;

means for placing said sub-image units proximate said lens units such that there is a said sub-image proximate each lens in said array of lenses; and wherein a given image portion from each said sub-image is viewed at a particular viewing angle between a viewer and said display device, the viewed image portions together forming a single unified image, and in which the viewed image portions change as the viewing angle changes, to present to the viewer a series of different fixed images as the viewer moves in relation to the display device.

2. The image display system of claim 1 in which said lenses are all the same shape and size.

3. The image display system of claim 1 wherein there are a plurality of lens units, and in which said means for holding together said lens units includes connector means mechanically connected with at least some of said lens units.

4. The image display system of claim 3 further including aperture stops for said lenses.

5. The image display system of claim 4 in which said connector means includes at least part of said aperture stops.

6. The image display system of claim 5 in which a said connector means includes half of the aperture stop of two adjacent lenses.

7. The image display system of claim 3 in which a said connector means includes said means for placing said sub-image units proximate said lens units.

8. The image display system of claim 7 in which said means for placing includes a sub-image capturing slot in said connector means.

9. The image display system of claim 3 in which said means for placing includes a sub-image holding backing member connectable to said connector means.

10. The image display system of claim 9 in which said backing member has a concave surface for holding said sub-image in a curved surface.

11. The image display system of claim 3 further including means for holding said connector means for fixing a plurality of lens units.

12. The image display system of claim 1 in which said lenses include a spherical surface.

13. The image display system of claim 1 in which said lenses include a cylindrical surface.

14. The image display system of claim 1 in which said lenses have multiple radii of curvature.

15. The image display system of claim 1 in which said means for placing includes means for maintaining said sub-images proximate the image surfaces of said lenses.

16. The image display system of claim 1 in which said means for placing includes means for maintaining said sub-images against a surface of said lenses.

17. The image display system of claim 1 further including aperture stops for each said lens.

18. The image display system of claim 1 in which said lenses are shorter than the display height and arranged to fill the display.

19. The image display system of claim 1 in which said lenses are arranged in a staggered lens array wherein each end of one lens is adjacent the ends of two other lenses.

20. The image display system of claim 1 in which said means for placing includes means for fixing each sub-image unit such that the sub-image picture element of each sub-image within the unit designed to be viewed at a given field angle intercepts the principal ray for that field angle.

21. The image display system of claim 1 in which said lenses of said lens array are evenly spaced.

22. The image display system of claim 1 in which said sub-image units include pixels offset in a non-orthogonal array.

23. The image display-system of claim 22 in which the pixel offset is accomplished by tilting the columns of an orthogonal array with respect to the lens orientation, or with respect to the viewer.

24. The image display system of claim 22 in which the pixel offset is accomplished by offsetting horizontal pixel positions in pixel rows.

25. The image display system of claim 1 in which said means for placing includes first alignment means associated with said sub-image units and second, mating alignment means associated with said lens units.

26. The image display system of claim 25 in which one of said first and second alignment means includes a projection and the other includes a projection-receiving hole or slot.

27. The image display system of claim 26 in which a said sub-image unit includes two openings for accepting two registration pins projecting from a said lens unit for properly laterally aligning said sub-image unit with said lens unit.

28. A spatially multiplexed image display device for displaying to a viewer a series of different fixed images as the viewer moves in relation to the display device, comprising:

a plurality of lenses, each having aperture stops for controlling image aberration, said lenses making up an array of lenses for viewing by a viewer;

a plurality of sub-images, each said sub-image carrying multiple separate image portions, each said image portion being a small portion of an overall image designed to be viewed in said display device, wherein there is one said sub-image for each lens in said array of lenses;

means for placing said sub-images proximate said lenses such that there is a said sub-image proximate each lens in said array of lenses;

wherein a given image portion from each said sub-image is viewed at a particular viewing angle between a viewer and said display device, the viewed image portions together forming a single unified image, and in which the viewed image portions change as the viewing angle changes, to present to the viewer a series of different fixed images as the viewer moves in relation to the display device.

29. The image display system of claim 28 further including a plurality of lens units each including a number of said lenses.

30. The image display system of claim 29 further including a sub-image unit for each said lens unit, wherein each said sub-image unit includes one sub-image for each lens of its corresponding lens unit.

31. A spatially multiplexed image display device for displaying to a viewer a series of different fixed images as the viewer moves in relation to the display device, comprising:

a plurality of separate lens units, each having a plurality of evenly-spaced lenses fixed together;

lens unit connector means for interjoining said lens units to make up a large array of lenses for viewing by a viewer;

a plurality of sub-image units, each having a plurality of sub-images, each said sub-image carrying multiple separate image portions, each said image portion being a small portion of an overall image designed to be viewed in said display device, wherein there is one said sub-image for each lens in said array of lenses;

means for placing said sub-image units proximate said lens units such that there is a said sub-image proximate each lens in said array of lenses; and wherein a given image portion from each said sub-image is viewed at a particular viewing angle between a viewer and said display device, the viewed image portions together forming a single unified image, and in which the viewed image portions change as the viewing angle changes, to present to the viewer a series of different fixed images as the viewer moves in relation to the display device.

32. A spatially multiplexed image display device for displaying to a viewer a series of different fixed images as the viewer moves in relation to the display device, comprising:

a lens unit having a first plurality of lenses making up an array of lenses for viewing by a viewer;

a plurality of sub-image units, each having a plurality of sub-images, each said sub-image carrying multiple separate image portions, each said image portion being a small portion of an overall image designed to be viewed in said display device, wherein them is one said sub-image for each lens in said array of lenses;

means for placing said sub-image units proximate said lens unit such that there is a said sub-image proximate each lens in said array of lenses;

wherein a given image portion from each said sub-image is viewed at a particular viewing angle between a viewer and said display device, the viewed image portions together forming a single unified image, and in which the viewed image portions change as the viewing angle changes, to present to the viewer a series of different fixed images as the viewer moves in relation to the display device.

33. A spatially multiplexed image display device for displaying to a viewer a series of different fixed images as the viewer moves in relation to the display device, comprising:

a plurality of separate lens units each having one lens, each said lens unit having a width and a length and edges;

means for holding together said lens units edge-to-edge to create a large array of lenses for viewing by a viewer, having at least one of a width and height dimension greater than the corresponding dimension of any of said lens units;

a plurality of sub-image units, each having one sub-image, each said sub-image carrying multiple separate image portions, each said image portion being a small portion of an overall image designed to be viewed in said display device, wherein there is one said sub-image for each lens in said array of lenses;

means for placing said sub-image units proximate said lens units such that there is a said sub-image proximate each lens in said array of lenses; and wherein a given image portion from each said sub-image is viewed at a particular viewing angle between a viewer and said display device, the viewed image portions together forming a single unified image, and in which the viewed image portions change as the viewing angle changes, to present to the viewer a series of different fixed images as the viewer moves in relation to the display device.

34. A spatially multiplexed image display device for displaying to a viewer a series of different fixed images as the viewer moves in relation to the display device, comprising:

one or more separate lens units, each having a plurality of lenses, each said lens unit having a width and a length and edges, each said lens having one or more lens elements;

one or more optically transparent backing members for each said lens unit;

means for fixing to said backing members at least one said lens element of each said lens of the respective one or more lens units, to create an array of lenses for viewing by a viewer;

one or more sub-image units, each having one or more sub-images, each said sub-image carrying multiple separate image portions, each said image portion being a small portion of an overall image designed to be viewed in said display device, wherein there is one said sub-image for each lens in said array of lenses;

means for placing said sub-image units proximate said lens units such that there is a said sub-image proximate each lens in said array of lenses; and wherein a given image portion from each said sub-image is viewed at a particular viewing angle between a viewer and said display device, the viewed image portions together forming a single unified image, and in which the viewed image portions change as the viewing angle changes, to present to the viewer a series of different fixed images as the viewer moves in relation to the display device.

35. The image display system of claim 34 wherein said lenses include aperture stops for controlling image aberration.

36. The image display system of claim 35 wherein said aperture stops are placed directly upon a said backing member.

37. The image display system of claim 35 wherein said aperture stops lie between a lens element and a said backing member.

38. The image display system of claim 34 wherein at least some of said plurality of lenses are integrally connected.

39. The image display system of claim 34 wherein at least some of said plurality of lenses each include more than one integrally-connected lens elements.

* * * * *